United States Patent
Lazis et al.

(10) Patent No.: US 9,017,058 B2
(45) Date of Patent: Apr. 28, 2015

(54) DOUGH FORMING STATION FOR A DEVICE FOR FORMING A DOUGH RING AND DEVICE FOR FORMING A DOUGH RING WITH A DOUGH FORMING STATION OF THIS TYPE

(75) Inventors: Jan Lazis, Bielefield (DE); Thomas Hagenhoff, Delbrück (DE)

(73) Assignee: Neuenkirchener Maschinenfabrik Emil Kemper GmbH, Rietberg (DE)

( * ) Notice: Subject to any disclaimer, the term of this patent is extended or adjusted under 35 U.S.C. 154(b) by 291 days.

(21) Appl. No.: 13/449,830

(22) Filed: Apr. 18, 2012

(65) Prior Publication Data

US 2012/0263815 A1    Oct. 18, 2012

(30) Foreign Application Priority Data

Apr. 18, 2011  (DE) .......................... 10 2011 007 558

(51) Int. Cl.
*A21C 11/08*    (2006.01)
*A21C 11/10*    (2006.01)
*A21C 11/00*    (2006.01)

(52) U.S. Cl.
CPC ................................... *A21C 11/002* (2013.01)

(58) Field of Classification Search
CPC .. A21C 11/004; A21C 11/002; A21C 11/008; A21C 11/02; A21C 11/08; A21C 11/166; A21C 3/10; A21C 5/003; A21C 5/08; A21C 7/005; A21C 7/04; A21C 7/06; A21C 14/00
USPC ......... 425/235, 237, 281, 287, 288, 292, 294, 425/298, 307, 310, 313, 328, 347, 364 B, 425/400, 402, 412, 418, 117, 123, 124, 125, 425/299
See application file for complete search history.

(56) References Cited

U.S. PATENT DOCUMENTS

| | | | | |
|---|---|---|---|---|
| 1,505,800 A | * | 8/1924 | Peavey | 425/554 |
| 1,625,649 A | * | 4/1927 | Gottfried | 425/348 R |
| 1,708,758 A | * | 4/1929 | Gottfried | 425/350 |
| 1,960,367 A | * | 5/1934 | Bellingroth | 425/100 |
| 2,146,786 A | * | 2/1939 | Baker | 425/357 |
| 2,584,514 A | * | 2/1952 | Thompson et al. | 425/324.1 |
| 2,611,329 A | * | 9/1952 | Lehman | 426/499 |
| 2,614,511 A | * | 10/1952 | Neutelings | 425/299 |
| 2,905,105 A | * | 9/1959 | Lombi | 99/450.6 |
| 3,302,592 A | * | 2/1967 | Werner | 425/471 |

(Continued)

FOREIGN PATENT DOCUMENTS

DE    1286472 B     1/1969
EP    1600058 A2    11/2005

*Primary Examiner* — Seyed Masoud Malekzadeh
(74) *Attorney, Agent, or Firm* — Browdy and Neimark, PLLC (57) ABSTRACT

A dough forming station for a device for forming a dough ring comprises a roller with a roller rotational axis and a plurality of dough forming inserts arranged on an outer lateral surface of the roller, a punch beam, which has a punch beam longitudinal axis, with at least one punch, wherein the dough ring is arranged for forming between the at least one punch and a dough forming insert, wherein a lifting drive is provided to displace the punch beam with the at least one punch along a stroke direction oriented perpendicular to the roller rotational axis, wherein the roller rotational axis and the punch beam longitudinal axis are oriented parallel to one another, and wherein a plurality of dough forming inserts arranged about the roller rotational axis along a rotational direction are provided.

25 Claims, 5 Drawing Sheets

(56) References Cited

U.S. PATENT DOCUMENTS

| | | | |
|---|---|---|---|
| 3,381,632 A * | 5/1968 | Pontecorvo | 426/389 |
| 3,425,363 A * | 2/1969 | Carbon | 425/195 |
| 3,733,058 A * | 5/1973 | Konig | 366/76.8 |
| 4,013,275 A * | 3/1977 | Schroder et al. | 366/76.8 |
| 4,155,691 A * | 5/1979 | Ridgeway et al. | 425/140 |
| 4,210,402 A * | 7/1980 | Schroder et al. | 366/76.8 |
| 4,586,888 A * | 5/1986 | Anderson | 425/362 |
| 4,957,425 A * | 9/1990 | Fay | 425/362 |
| 4,996,914 A * | 3/1991 | D'Alterio | 99/450.6 |
| 5,158,785 A * | 10/1992 | Konig | 425/233 |
| 5,227,174 A * | 7/1993 | Konig | 425/147 |
| 5,297,947 A * | 3/1994 | Cardinali | 425/194 |
| 5,441,342 A * | 8/1995 | Konig et al. | 366/76.7 |
| 5,486,048 A * | 1/1996 | Konig | 366/76.8 |
| 5,503,860 A * | 4/1996 | Donnelly et al. | 426/420 |
| 7,178,456 B1 * | 2/2007 | Bryan | 101/5 |
| 7,421,947 B2 * | 9/2008 | Bryan | 101/3.1 |
| 7,758,330 B2 | 7/2010 | Peitzmeier et al. | |
| 2001/0028908 A1 * | 10/2001 | Schiessl | 426/504 |
| 2007/0144361 A1 * | 6/2007 | Bryan | 101/5 |

\* cited by examiner

DOUGH FORMING STATION FOR A DEVICE FOR FORMING A DOUGH RING AND DEVICE FOR FORMING A DOUGH RING WITH A DOUGH FORMING STATION OF THIS TYPE

CROSS-REFERENCES TO RELATED APPLICATIONS

This application claims the priority of German Patent Application, Serial no. 10 2011 007 558.5, filed Apr. 18, 2011, pursuant to 35 U.S.C. 119(a)-(d), the content of which is incorporated herein by reference in its entirety as if fully set forth herein.

FIELD OF THE INVENTION

The invention relates to a dough forming station for a device for forming a dough ring and a device for forming a dough ring with a dough forming station of this type.

BACKGROUND OF THE INVENTION

A device for forming a ready-to-bake, connectionless dough ring is known from EP 1 600 058 A2. A dough forming station is disclosed as a stamping station there, a central dough portion being stamped out by means of a stamping punch. The dough ring is arranged on a conveying means. When stamping out the dough portion, the stamping punch is pressed against the conveyor belt located below it. The conveyor belt is driven mechanically.

SUMMARY OF THE INVENTION

An object of the present invention is to provide a dough forming station for a device for forming a dough ring in such a way that a product change of dough rings to be produced is facilitated and, in particular, wear of tools for dough forming is reduced.

This object is achieved according to the invention by a dough forming station for a device for forming a dough ring, comprising a roller with a roller rotational axis and a plurality of dough forming inserts arranged on an outer lateral surface of the roller, and a punch beam, which has a punch beam longitudinal axis, with at least one punch, wherein the dough ring can be arranged for forming between the at least one punch and a dough forming insert, wherein a lifting drive is provided to displace the punch beam with the at least one punch along a stroke direction oriented perpendicular to the roller rotational axis, wherein the roller rotational axis and the punch beam longitudinal axis are oriented parallel to one another, and wherein a plurality of dough forming inserts arranged about the roller longitudinal axis along a rotational direction are provided.

It was recognised according to the invention that a dough forming station for forming a dough ring has at least one punch and a plurality of dough forming inserts each cooperating with the at least one punch. The dough forming inserts are arranged on an outer lateral surface of a roller. The roller has a roller rotational axis. The at least one punch is arranged on a punch beam, a punch beam longitudinal axis being oriented parallel to the roller rotational axis. The punch beam has a lifting drive to displace the punch beam with the at least one punch along a stroke direction relative to the roller. The stroke direction is oriented perpendicular to the roller rotational axis. To form the dough ring, the dough piece is arranged between the at least one punch and the dough forming insert of the roller, the punch being moved by means of the lifting drive toward the roller. Consequently, it is possible, in particular, for the at least one punch to enter the dough piece in order to stamp out a centrally arranged dough portion. The at least one punch and the dough forming insert can be matched to one another in such a way that, during the dough forming in the dough forming station, the punch is arranged, during a stroke movement, at least in portions and/or at least temporarily, in a dough forming insert opening formed by the dough forming insert. This means that the punch can "enter" the dough forming insert opening of the dough forming insert. Consequently, direct contact between the at least one punch and the dough forming insert is avoided. Wear of the two tools for dough forming, i.e. the at least one punch and the dough forming insert, is reduced. Since a plurality of dough forming inserts arranged along a rotational direction about the roller rotational axis are provided, the wear for each dough forming insert can be additionally reduced with the dough forming station. In particular, the variability of the products to be produced with said dough forming station is also improved. For example, small dough rings, so-called "mini doughnuts" can be produced thereby, having a weight of, for example, 15 to 18 g. Conventional doughnuts can also be produced by said dough forming station. In particular, the dough forming station allows a product change on a dough processing system, a tool equipping outlay for this being reduced and therefore, in particular, it being possible to carry out a product change quickly. Said dough forming station can also lead to an improved, and in particular disruption-free, removal of stamped-out dough portions.

A dough forming station, in which the roller has a roller drive for a rotational movement along the rotational direction in such a way that a dough forming insert faces the at least one corresponding punch, makes an alternating arrangement of the roller possible in such a way that the at least one punch can cooperate in successive strokes with various dough form inserts. Consequently it is possible, for example, for a plurality of dough forming inserts provided on the roller to be driven uniformly, i.e. with the same number of dough forming strokes. Consequently, the operating life of the roller is increased. Because of the roller drive, which allows a rotary movement of the roller in a rotational direction, the roller can also take on an entraining, conveying function for the dough piece. The rotary movement of the roller can be clocked or can take place continuously.

A dough forming station-, comprising a dough forming insert arrangement, which has a plurality of dough forming inserts arranged parallel to the roller rotational axis, and a punch arrangement, which has a plurality of punches arranged on the punch beam along the punch beam longitudinal axis, makes a higher production rate possible, as a plurality of dough pieces arranged perpendicular to a conveying direction are processed with one stroke of the punch beam. In this case, a dough forming insert arrangement may, for example, have ten dough forming inserts along the roller rotational axis. Accordingly, a punch arrangement along the punch beam longitudinal axis on the punch beam has ten punches. Other numbers are also possible, depending on the size and number of the dough rings to be formed or a conveyor belt.

A dough forming station, comprising a plurality of dough forming insert arrangements, which are arranged about the roller rotational axis along the rotational direction, has an additionally increased productivity.

A dough forming station, in which the dough forming insert arrangements are arranged equidistantly along the rotational direction, in particular with a rotation angle with respect to the roller rotational axis of 90°, allows a cyclically alternating use of the dough forming insert arrangements on the roller. In particular, the dough forming insert arrangements are arranged equally spaced apart from one another with a rotation angle of 90° with respect to the roller rotational axis. This means that the roller is rotated about the roller rotational axis through 90° between two strokes. In a first stroke, the punch arrangement cooperates with a first dough forming insert arrangement. After the 90° rotary movement about the roller rotational axis along the rotational direction, the punch arrangement cooperates with a second dough forming insert arrangement.

A dough forming station, in which further dough forming insert arrangements, which, in particular, have various types of dough forming inserts, are provided between the equidistantly arranged dough forming insert arrangements, has an improved insert variability, in that various dough forming inserts are provided in various dough forming insert arrangements. It is consequently possible to carry out the production of a new product line with the same dough forming station, reequipping work being unnecessary. In this context, a new product line, for example, comprises dough pieces of different size, in other words with different internal and/or external diameters of the dough rings, the dough forming inserts having different internal diameters. For example, it is possible to arrange three groups of different dough forming arrangements alternately along the periphery of the roller, a rotation angle with respect to the roller rotational axis of 90° being provided, in each case, between the same types of dough forming insert arrangements. In total, a roller of this type has twelve dough forming insert arrangements. It is also possible to arrange various dough forming insert arrangements transverse to the roller rotational axis. In this case, identical dough forming inserts, each forming a dough forming insert arrangement, could be provided along the periphery of the roller. A dough forming insert arrangement is thus arranged annularly with respect to the roller rotational axis on the periphery of the roller. Accordingly, the roller, in this case, has a variable division between dough forming inserts transverse to the rotational direction.

A dough forming station, comprising a plurality of punch arrangements on the punch beam, the punches, in particular, of various punch arrangements having different external punch diameters, has a plurality of punch arrangements on the punch beam. Consequently, it is possible to additionally reduce the equipping time upon a product change at the dough forming station. By rotating the punch beam about the punch beam longitudinal axis, a second punch arrangement different from a first punch arrangement can be displaced into a processing position. It is possible for the punch of the different punch arrangements to be identical. As a result, it is possible to reduce an interval for a punch change. It is additionally or alternatively possible to use punches with different punch geometries in at least one punch arrangement. As a result, the variability of dough rings to be produced is increased. Stoppage times at the dough forming station are thereby reduced as a result of a required tool change.

A dough forming station, in which the dough forming inserts are arranged in a self-centring manner on the roller and, in particular, have a thread, and, in particular, a fine thread, for screwing onto the roller, allows dough rings to be produced with increased manufacturing precision. Since the dough forming inserts are arranged in a self-centring manner on the roller, assembly and disassembly are possible more rapidly and in a simplified manner.

In particular, an adjustment of the dough forming inserts, which is expensive and time-consuming to carry out, is unnecessary. For this purpose, it may be provided that the dough forming inserts on the roller have a thread and, in particular a fine thread for screwing onto the roller. For example, this allows a positioning of the dough forming inserts on the outer lateral surface of the roller with a precision of 0.05 mm.

A dough forming station, in which dough forming inserts are stamping matrices, in particular matrix changing inserts, makes it possible to stamp out an, in particular, centrally arranged dough portion of a dough piece. As a result, it is possible to produce a connectionless dough ring rapidly and in an uncomplicated manner. In particular, it is possible for stamping matrices to have a continuous matrix opening, which is oriented, in particular, radially with respect to the roller rotational axis, as the dough forming insert openings, so the stamped-out dough portion is pushed through the matrix opening into the interior of the roller. To improve the removal of the ejected dough portion, a removal belt may be arranged in the interior of the roller, allowing the automatic removal of the stamped-out dough portions.

A dough forming station, in which the stamping matrices have different internal matrix diameters, allows the production of various dough ring sizes, in particular with various internal diameters of the dough rings with a reduced equipping time of the dough forming station. Since the stamping matrices have different internal matrix diameters, dough rings of different sizes can be produced rapidly and in an uncomplicated manner. It is also possible to provide, instead of or in addition to stamping matrices of different matrix diameters, other tool inserts at the roller, such as, for example, pricking moulds or other shaping tool cavities. Analogously with the arrangement of the dough forming insert arrangements, in which further dough forming insert arrangements, which, in particular, have various types of dough forming inserts, are provided between the equidistantly arranged dough forming insert arrangements, it is also possible to provide various stamping matrices or other tool inserts transverse to the rotational direction, i.e. along the roller rotational axis.

A dough forming station, comprising a polygonal external contour of the roller oriented perpendicular to the roller rotational axis, with substantially level support face portions of the dough forming inserts, has a roller with improved function integration. Since the roller at its outer lateral surface has level support face portions in the region of the dough forming inserts, it is possible to use the roller to receive, entrain, form the dough, forward and transfer the dough piece to a subsequent conveying means. For this purpose, the roller is rotated during a dough processing step at the dough forming station about the roller rotational axis, the level support face portion being arranged perpendicular to a stroke direction of the punch stroke movement and, in particular horizontally, in particular during the dough forming by the punch. The roller pauses in this arrangement during the dough forming process, in other words, the roller is not rotated.

A dough forming station, comprising a centring means associated with the at least one punch, for centring the dough ring on the dough forming insert before the dough forming by the at least one punch, makes it possible to produce dough rings with an increased manufacturing precision. In particular, the stamped-out dough portion is oriented concentrically with respect to the disc form of the dough. For this purpose, a centring means has a signal connection by means of a control unit with the at least one punch. The control unit allows a controlled kinematic connection of the centring means with the at least one punch. The centring means may, however, also be displaced independently of the at least one punch by means of the control unit. As a result of the stroke movement of the at least one punch, the centring means firstly comes into contact with the dough piece and ensures a centring of the dough piece on the dough forming insert. As a result, the unstamped dough piece is oriented in a centred manner both with respect to the at least one punch and with respect to the dough forming insert. The dough forming then takes place by the at least one punch.

In a dough forming station, in which the at least one punch is arranged in a self-centring manner on the punch beam, in particular has a thread and, in particular, a fine thread, for screwing on the punch beam, as well as, in particular, a fitting surface for arranging on the punch beam in a defined position, the assembly and disassembly of the punch on the punch beam is facilitated. In particular, an automatic docking of the punch on a compressed air channel of the punch beam is provided. The compressed air channel is used for supporting loading of the dough portion to be stamped out with compressed air during a stamping process. This ensures that a dough portion stamped out by means of the punch does not adhere to the punch and therefore lead to an impairment of subsequent stamping operations. Furthermore, it is possible for the at least one punch to have a thread and, in particular, a fine thread, for screwing to the punch beam. Moreover, the punch may have a fitting surface facing the punch beam, whereby the punch is arranged in a defined position on the punch beam.

A dough forming station, in which a control unit for electronic forced control, in particular a master-slave control, is in signal connection to the dough forming station, wherein, in particular, the dough processing at a fermenting station is used as the master process for the dough processing and the dough forming station is used as the slave process, allows improved operation of the device. Since a control unit allows an electronic forced control, it is unnecessary to monitor individual processing stations of the device separately with regard to a current dough piece position. Monitoring of this type would result in a discontinuous, clocked operation of the device. A mode of operation of this type of the device has a reduced production speed, in other words production rate. As a result of constant acceleration and deceleration processes, which act on the conveying means and also the dough pieces themselves, the conveying means and the dough pieces are mechanically stressed. These drawbacks are avoided by means of an electronic forced control. It is possible, in particular, to use a master-slave control, in which the dough processing is electronically controlled in the dough forming station as a slave process by the dough processing at the fermenting station, as the master process. A forced control of this type is also called an electronic or virtual cam disc.

A dough forming station, in which the at least one punch has a stamping portion with a stamping diameter and an entraining portion with an entraining diameter, the stamping diameter being larger than the entraining diameter, allows improved production of dough rings. A preformed, disc-like dough piece, before a stamping process, has a substantially continuous dough mass, which is surrounded by an, in particular, fine external skin. The fine external skin is pierced and a dough portion stamped out using a stamping portion, which is arranged concentrically with respect to the punch longitudinal axis, of the at least one punch. When severing the end face of the dough piece facing the punch, a substantially annular external skin surface results, which is turned into the interior of the dough piece to be processed. With a further continuing of the stamping process, the external skin cutting face projecting into the interior of the dough piece is entrained by an entraining portion of the punch. Since the entraining portion has a diameter which is enlarged compared to the stamping portion with respect to a punch longitudinal axis, the opening in the dough piece produced by the stamping portion is widened by the entraining portion, the external skin of the upper end face of the dough piece not being stamped by the entraining portion. The entraining portion entrains the external skin cutting face projecting inwardly and pulls it downwardly along the stroke movement of the punch to the lower end face of the dough piece, so the previously open cutting face of the external skin of the upper end face is connected to the external skin of the lower end face. This produces a dough ring, which has a closed external skin on all the side faces. In particular, a cylindrical external skin is produced on the inner ring face of the dough ring by the punch designed in a step-like manner. This improves the shaping of the dough ring. Pasty dough of the dough ring at the inner cylindrical lateral surface escaping from the ring form of the dough ring is, in particular, prevented when the punch is drawn back after the stamping process. Using said punch, dough rings can be produced with increased precision and with improved dimensional stability. Said punch is, in particular, configured in a rotationally symmetrical manner with respect to the punch longitudinal axis, other cross sectional forms also being possible perpendicular to the punch longitudinal axis, such as, for example, a rectangular, hexagonal, oval or other form. The diameter difference between the stamping diameter and the entraining diameter is, in particular, such that half the diameter difference corresponds to the thickness of the dough piece along the punch longitudinal axis. The diameter difference may also be greater than said value. This ensures that the open cutting faces entrained by the entraining portion, of the upper end face extend downward to the lower end face of the dough ring to be connected there to form a closed external skin.

A further object of the present invention is to provide a device for forming a dough ring, which makes improved dough forming possible.

This object is achieved according to the invention by a device for forming a dough ring with a dough forming station according to the invention.

A device of this type has a dough forming station according to the invention. The advantages of the device correspond to those of the dough forming station. Moreover, the device allows both a clocked and a continuous operation of the dough ring production. In addition, it is possible to adjust a pass-operation using the device, so an additional belt for dough products not to be processed, in particular for dough products not to be stamped, is unnecessary, as a direct pass at the dough forming station is possible. This may take place, for example, in that the punch beam in a punch arrangement has no punches or punches of the type which, as a result of a stroke movement, do not come into contact with the dough pieces on the roller.

An embodiment of the invention will be described in more detail below with the aid of the drawings.

DESCRIPTION OF THE PREFERRED EMBODIMENT

Figure 1:
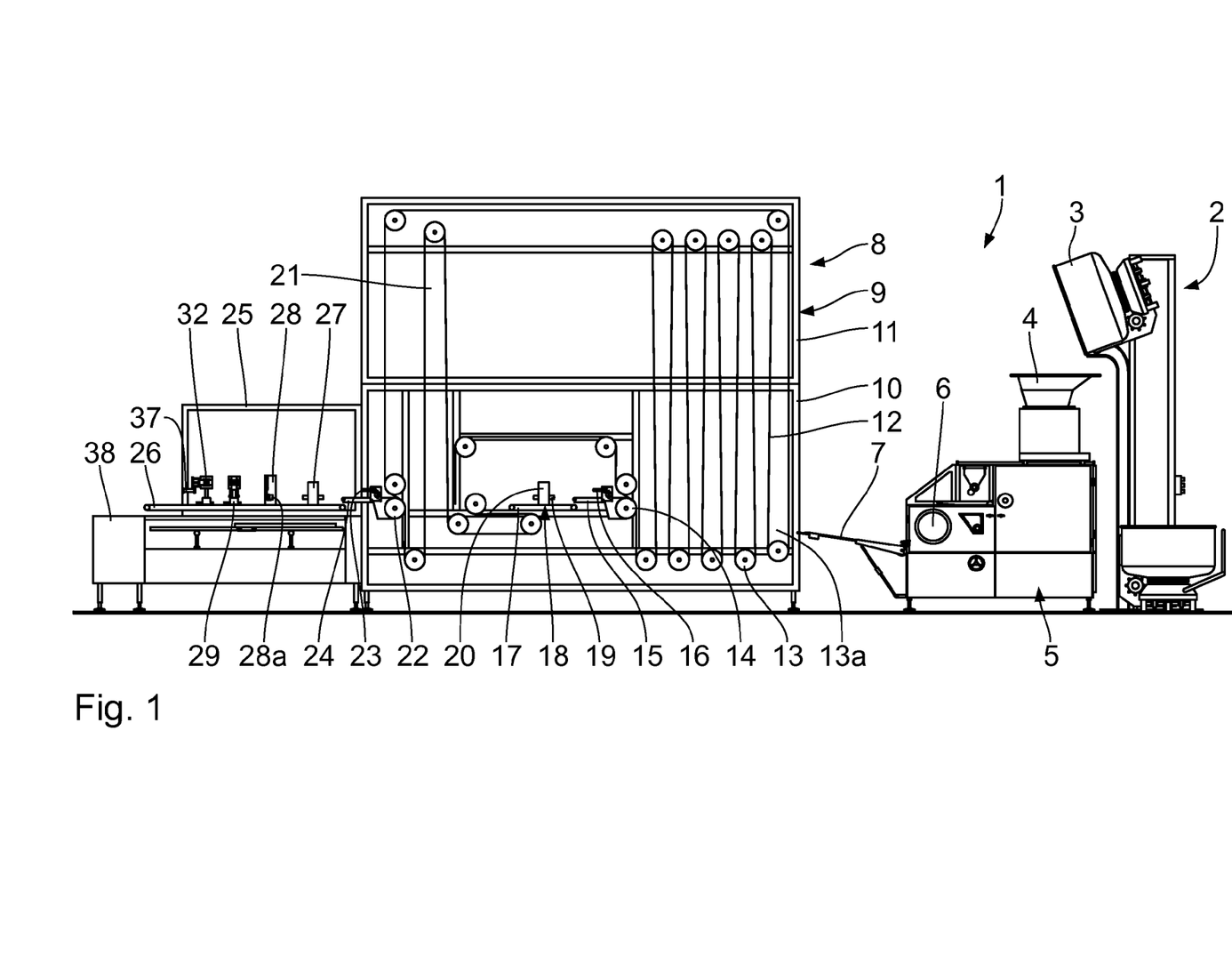
FIG. 1 shows a side view of a device showing internal details, for forming a dough ring according to the prior art.

An embodiment shown in FIG. 1 of a device 1 for forming a dough ring 40 is known from EP 1 600 058 A2. The device in the form of a dough processing system 1 comprises a lifting-tilting device 2 for supplying dough. The lifting-tilting device 2 has a liftable and tiltable trough 3, which is shown in FIG. 1 both in a kneading and also in a lifted and pivoted delivery position. In the delivery position of the trough 3, a feed funnel 4 of a portioning and rounding means 5 is located underneath it. The portioning and rounding means 5 comprises a rounding station 6. This is connected by a six-string transfer conveyor belt 7 to a modularly constructed fermenting and forming device 8. The further processing stations of the dough processing system 1 process six rows of dough pieces in parallel.

A suspension conveying means 9, which is accommodated in two part modules 10, 11, arranged one above the other, of the fermenting and forming device 8, has a conveying connection with the delivery end of the transfer conveyor belt 7. The suspension conveying means 9 comprises a plurality of suspension devices, not shown for receiving dough pieces. The suspension devices are connected to a conveyor chin 12, which is guided to circulate continuously by means of a plurality of deflection rollers 13. The conveyor chain 12 in the part modules 10, 11 circulates substantially in the clockwise direction during conveyance.

Proceeding from the delivery end of the transfer conveyor belt 7, the conveyor chain 12 runs repeatedly up and down in an intermediate fermenting station 13a until a pair 14 of deflection rollers 13 located directly one above the other is reached. The suspension devices are turned over there by an entrainer, so the dough pieces located therein arrive on a conveyor belt portion 15. Associated with this is a first pressure roller 16, which preforms the dough pieces running past underneath it on the conveyor belt portion 15 in such a way that they cannot roll in an undefined manner on the conveyor belt portion.

From the conveyor belt portion 15, the dough pieces arrive on a further conveyor belt portion 17. Associated with this is a pressure station 18. This has a pressure belt 19, which is driven and can be moved guided by a stand 20. From the delivery end of the further conveyor belt portion 17, the dough pieces, after the pressure station 20, arrive back in a suspension device of the suspension conveying means 9. The suspension conveying means 9 is synchronised with the operation of the conveyor belt portions 15, 17 in such a way that when dough pieces are delivered by the further conveyor belt portion 17 a suspension device is always available at the delivery end of the conveyor belt portion 17 to receive the dough pieces.

Following the transfer position at the delivery end of the conveyor belt portion 17, the conveyor chain 12 is guided up and down again by further deflection rollers 13. In this case, the suspension devices run through a second intermediate fermenting station 21. Following this, the suspension devices pass a further pair 22 of deflection rollers 13 and a further pressure roller 23 with an associated conveyor belt portion 24. The dough pieces are transported by the latter into a forming means 25 of the fermenting and forming device 8, which is housed in a further part module thereof.

In the forming means 25, the dough pieces firstly arrive from the conveyor belt portion 24 onto a further conveyor belt portion 26. There, they firstly pass a further pressure station 27, which is constructed just the same as the pressure station 18. The dough pieces are then transported from the conveyor belt portion 26 to a centring station 28, in which the round dough pieces are oriented in a centred manner. The centring station 28 has a stop 28a to centre the dough pieces. Following this, the centred dough pieces are conveyed from the conveyor belt 26 to a displacement station 29. The latter comprises a driven liftable pressure tool, not visible in FIG. 1, in the form of a punch with a spherical end. A carrier of the pressure tool is mounted on a stand of the displacement station 29. In the displacement station 29, an outward displacement of a central dough portion takes place by pressing the pressure tool on the dough piece in such a way that the thickness of the dough piece is reduced in the centre of the dough piece compared to the remainder of the dough piece.

After the displacement station 29, the dough piece that has been preformed in this manner is conveyed by the conveyor belt portion 26 to a stamping station 32. The stamping station 32 is a dough forming station not according to the invention. It has a stamping tool in the form of a driven liftable stamping pin. The stamping tool is mounted on a carrier, which is pivotably mounted about a pivot axis, which is perpendicular to the plane of the drawing of FIG. 1, with respect to a stand of the stamping station 32. The stamping tool with the carrier is shown in FIG. 1 in a delivery position, in which the stamping tool is pivoted relative to the stamping position in FIG. 1 through 90° in the clockwise direction about the pivot axis. In the stamping position, the stamping tool therefore extends vertically like the pressure tool of the displacement station 29, in other words perpendicular to the conveying plane, which is predetermined by the conveyor belt portion 26. In the delivery position, a further conveyor belt portion 37 is located under the free end of the stamping tool. Said conveyor belt portion is used to pick up and remove the stamped-out dough portion, which is ejected by the stamping tool. The stamping station 32 may have two stamping tools, wherein when one of the two stamping tools is moved from the stamping position into the delivery position, the other of the two stamping tools always moves up into the stamping position.

Following the stamping station 32, the stamped-out dough piece is trans-ported onward by the conveyor belt portion 26 for further processing. Associated with the delivery end of the conveyor belt portion 26 is a delivery station 38, in which the stamped-out dough pieces are deposited on metal sheets. The dough pieces are then introduced manually into fermenting cabinets for secondary fermenting. The dough pieces can also be automatically transported to one or more fermenting cabinets.

Connectionless, ready-to-bake dough rings, for example doughnuts, can be produced using the dough processing system 1 as follows: Firstly, dough is kneaded in the trough 3 of the lifting-tilting device 2 and automatically introduced via the feed funnel 4 into the portioning and rounding means 5. The kneading of the dough in the trough 3 takes place in an upstream kneading step by means of a kneading device, not shown. A portioning of the dough that has been introduced into individual dough pieces, which are then rounded in the rounding station 6, firstly takes place in the portioning and rounding means. The rounded dough pieces then arrive in six rows via the transfer conveyor belt 7 into the suspension devices of the suspension conveying means 9 and are intermediately fermented in the first intermediate fermenting station 13a. The dough pieces then arrive, having been turned, on the conveyor belt portion 15 and are lightly pressed by the pressure roller 16 so that they cannot roll in an undefined manner. The dough pieces are then more strongly pressed flat in the pressure station 18 by the cooperation of the pressure belt 19 with the conveyor belt portion 17, so that they receive a flattened round shape. A round piece is therefore formed, the transverse extent of which, transverse to the pressure direction, is greater than its height along the pressure direction. The pressed dough pieces then arrive back in the suspension devices of the suspension conveying means 9 and are intermediately fermented further in the second intermediate fermenting station 21. The dough pieces are then turned again and arrive on the further conveyor belt portion 24, where they are lightly pressed a further time by the pressure roller 23, so that they can no longer roll in an undefined manner A further stronger pressing takes place in the pressure station 27, the dough pieces receiving a more strongly flattened shape. After the pressing of the dough pieces in the pressure stations 18, 27, a relaxing of the dough pieces takes place, in each case. The dough pieces, which are rotationally symmetrical about a vertical axis, are then centred in the centring station 28. This takes place with the aid of the stop 28a. After centring, the dough pieces arrive in the displacement station 29 where the central dough portion is displaced with the aid of the pressure tool. The dough pieces then arrive in the stamping station 32 where the central dough portion, which is then only present as thin skin because of the displacement, is stamped out with the aid of the stamping tool. The displaced dough portion and the inner hole in the dough piece formed by the stamping then lie centrally therein. The stamping tool is transferred after stamping into the delivery position shown in FIG. 3 and delivers the stamped-out dough portion onto the conveying portion 37. The dough ring produced after stamping is then deposited on metal sheets in the depositing station 38. After the secondary fermenting, the dough rings are either deep frozen, guided through an end fermenting station, not shown or immediately baked to form doughnuts.

The dough processing system 1 works in a clocked manner. In particular the conveyor belt portion 26 conveys in a clocked manner, the pressing taking place in the pressure station 27, the displacement taking place in the displacement station 29 and the stamping taking place in the stamping station 32 when the dough pieces rest. The clocked conveyance of the conveyor belts 7, 15, 17, 24 and 26 is synchronised with the conveyance of the suspension conveying means 9.

The dough processing system 1 according to FIGS. 1 to 4 has two pressure stations 18, 27. Alternatively, another number of pressure stations may also be provided.

To produce doughnuts without the hole, the displacement station 29 and the stamping station 32 and optionally also the pressure stations 18 and 27 can be inactivated in such a way that the dough pieces pass these stations without being formed there. The dough processing system 1 can otherwise be operated precisely as described above in conjunction with the production of doughnuts. In this manner, doughnuts without the hole can also be produced using the dough processing system 1. An operation of the dough processing system 1 in this manner is also called pass-operation.

Figure 2:
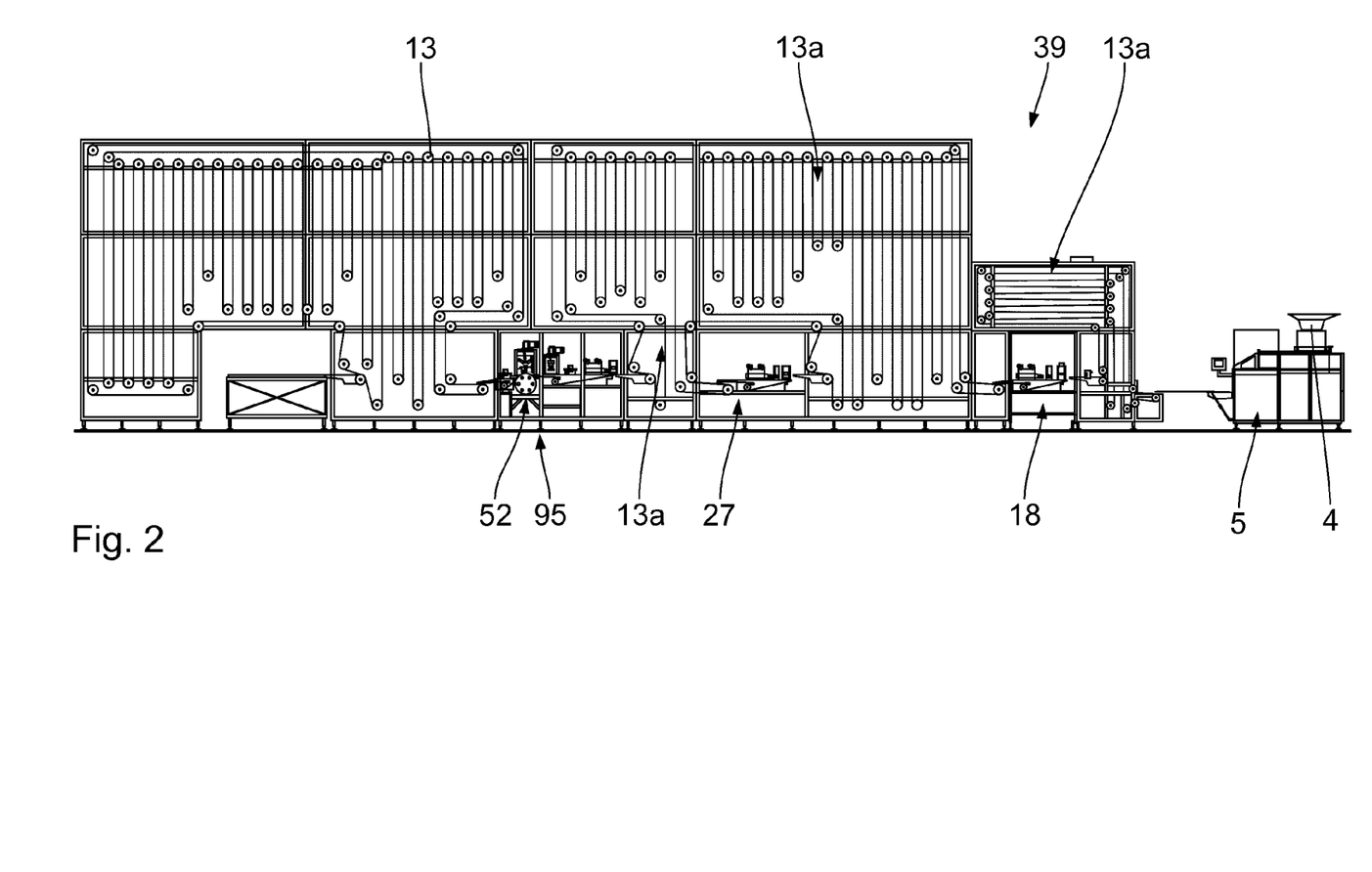
FIG. 2 shows a side view corresponding to FIG. 1 of a device according to the invention for forming a dough ring.

FIG. 2 shows an embodiment according to the invention of a device 39 for forming a dough ring 40. Components which have already been discussed with reference to the embodiments shown in FIG. 1 have the same reference numerals and will not be described again in detail.

The essential difference of the device 39 according to the invention relates to a dough processing unit 95 and a dough forming station 52 according to the invention.

Furthermore, the device 39 comprises two pressure stations 18, 27, which are designed as flat pressure stations in accordance with the device 1. Provided in front of the first flat pressure station 18, between the flat pressure stations 18, 27, between the flat pressure station 27 and the dough processing unit 95 and after the dough processing unit 95 with the dough forming station 52 are preliminary, intermediate and end fermenting stations 13a, which, accordingly, allow a preliminary, intermediate and end fermenting of the dough pieces between the individual processing stations 18, 27 and 95 as well as beforehand and thereafter. The fermenting stations 13a are arranged in fermenting cabinets provided for this. The fermenting stations 13a, depending on the product to be produced, can be switched on and off individually and, in particular, independently of one another in the production sequence, i.e. at the device 39, so that, for example, individual or all the fermenting steps between the individual processing stations may also be dispensed with. In the device 39, in particular between zero and three pressure stations are used. It is also conceivable to provide more than three flat pressure stations.

Figure 3:
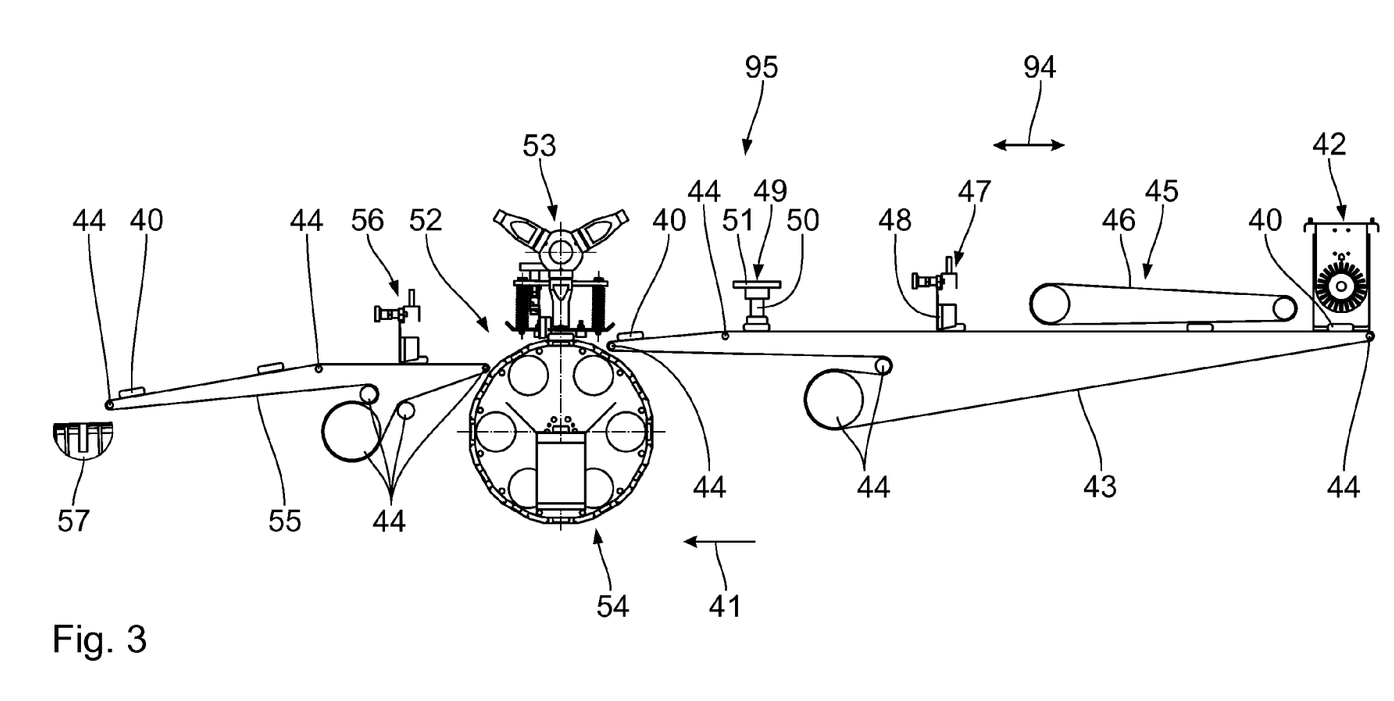
FIG. 3 shows a side view corresponding to FIG. 2 of a detail of the device with a dough forming station according to the invention.

FIG. 3 shows the dough processing unit 95 as a detail of the device 39 with a dough forming station 52 according to the invention. Components, which correspond to those which have already been discussed above with reference to FIG. 1 have the same reference numerals and will not be discussed again in detail. The view of the dough processing unit 95 in FIG. 3 is schematic and therefore simplified. In particular, for reasons of clarity, structure components and, for example, a machine frame of the device 39 or the dough processing unit 95 and the dough forming station 52 are not shown completely. The dough forming station 52 can replace the stamping station 32 according to FIG. 1.

The detail of the device 39 shown in FIG. 3 adjoins the fermenting and forming device 13a and is used to process the dough pieces 40 along a dough piece conveying direction 41. The device 39 may also have a kneading device, a lifting tilting device and/or a portioning and rounding means.

The detail of the device 39 shown in FIG. 3, along the dough piece conveying direction 41, comprises a sprinkling station 42 for sprinkling the dough pieces 40 with flour. It is also possible for the dough pieces 40 to be sprinkled with a powdery medium other than flour. From the sprinkling station 42, the dough pieces 40 are conveyed along the dough piece conveying direction 41 by means of a transporting belt 43 configured as a conveying means. The transporting belt 43 is guided or driven by a plurality of drive/deflection rollers 44. Along the dough piece conveying direction 41, a flat pressure station 45 is arranged downstream of the sprinkling station 42. The flat pressure station 45 comprises a driven upper belt 46, which runs in a lower portion facing the transporting belt 43, a substantially parallel to the transporting belt 43. The upper belt 46 can be displaced with regard to its position with respect to the transporting belt 43 in such a way that a gap formed between the upper belt 46 and the transporting belt 43 can be variably adjusted. The gap may have a constant gap width along the dough piece conveying direction 41 or else have a conical course of the gap width in such a way that the gap width along the dough conveying direction 41 increases or decreases. In the flat pressure station 45, the dough pieces 40 are pressed by the upper belt 46 against the transporting belt 43.

In the view in FIG. 3, a plurality of dough pieces 40 are arranged on the transporting belt 43 next to one another, i.e. perpendicular to the plane of the drawing. It is, for example, possible for ten dough pieces 40 to be conveyed next to one another by the transporting belt 43.

Along the dough piece conveying direction 41, a first centring station 47 is arranged following the flat pressure station 45. The first centring station 47 ensures a predetermined positioning of the dough pieces 40 on the transporting belt 43 for a subsequent processing station. This is necessary, in particular, as, because of an action of force during the processing in the flat pressure station 45, the dough pieces 40 can be unintentionally displaced on the transporting belt 43. The first centring station 47 comprises a plurality of metal centring sheets 48, in particular one for each dough piece 40. Each metal centring sheet 48 has a substantially U-shaped profile cross section oriented perpendicular to the transporting belt 43, two U-legs extending away from a U-base being arranged in a funnel-shape or trapezoidally. The first centring station 47 can be height-adjustably arranged with the metal centring sheets 48 with respect to the transporting belt 43. The centring station 47 can be adjustably arranged along the dough piece conveying direction 41, as indicated in FIG. 3 by the double arrow 94.

Along the dough conveying direction 41, a pressure station 49, which substantially corresponds to the displacement station 29 of the device 1, is arranged downstream of the first centring station 47, reference being hereby made to this. The pressure station 49 comprises a plurality of pressure tools in the form of pressure punches 50 for separately pressing the dough pieces 40. The pressure punches 50 are connected to one another at a common pressure plate 51 at an end of the punches 50 remote from the dough pieces 40. The pressure plate 51 allows synchronous actuation of the pressure punches 50 with a drive, not shown. The dough pieces 40 pressed in the pressure station 49 are conveyed by means of the transporting belt 43 to the dough forming station 52. The dough forming station 52 comprises a punch beam 53, which is arranged above the dough pieces 40 to be processed, as well as a roller 54, which is arranged below the dough pieces 40 to be processed. From the dough forming station 52, the formed dough rings 40 are transferred to a delivery conveyor belt 55, which is driven or guided in accordance with the transporting belt 43 by means of a plurality of drive/deflection rollers 44. A second centring station 56 is arranged down-stream of the dough forming station 52 at the delivery transporting belt 55. From the second centring station 56, the dough rings 40 are conveyed by means of the delivery transporting conveyor belt 55 to a suspension device 57. The suspension device 57 is configured in the form of a trough, which is suitable, for example, to be connected by means of a conveyor chain, not shown, to a plurality of suspension devices. The conveyor chain may, for example, be configured to revolve continuously, for example by via a plurality of deflection rollers, so a continuous removal of the dough rings from the delivery conveyor belt 55 is ensured. A downstream fermenting of the dough rings 40 in the fermenting station 13a shown in FIG. 2 may take place by means of the suspension devices.

The dough forming station 52 will be described in detail below with the aid of FIG. 4. The dough forming station 52 comprises the roller 54 arranged at the bottom in FIG. 4, which can be rotatably driven about a roller rotational axis 58 by means of a roller drive, not shown, for a rotary movement along a rotational direction 59. The roller 54 has a polygonal external contour, which is oriented perpendicular to the roller rotational axis 58 and comprises an outer lateral surface 60, which is cylindrical at least in portions, and a plurality of dough forming inserts 61, 62, 63 arranged on the outer lateral surface 60. The cylindrical shape of the outer lateral surface 60 of the roller is, in particular, exclusively interrupted in the region of the dough forming inserts 61, 62, 63. The dough forming inserts 61, 62, 63 are configured as stamping matrices, which can be assembled and disassembled as matrix changing inserts on the roller 54. The stamping matrices 61, 62, 63 in each case have a matrix opening 64 oriented radially with respect to the roller rotational axis 58. The stamping matrices 61, 62, 63 differ in that an internal matrix diameter $d_{i1}$, $d_{i2}$, $d_{i3}$ facing the outer lateral surface 60 of the roller 54 is different. The internal matrix diameter $d_{i1}$, $d_{i2}$, $d_{i3}$ widens conically along the matrix opening 64 proceeding from the outer lateral surface 64 of the roller 54 to the interior of the roller. As a result, it is easier, in particular, to push through the dough piece 40 during a stamping process.

The stamping matrices 61, 62, 63 are rotationally symmetrical with respect to the matrix opening 64 and have a level end face 65 oriented outwardly on the roller 64. The end faces 64 are level support face portions on the outer lateral surface 60 of the roller 54. Since the end face 65 is level, a secure and defined depositing of a dough piece 40 on the end face 65 is ensured. At an end facing the end face 65, the matrix opening 64 has a bevel, which reduces mechanical loading, and therefore wear, of the stamping matrices 61, 62, 63 during a stamping process.

A plurality of stamping matrices 61, 62, 63, ten according to the embodiment shown, are in each case combined to form a dough forming insert arrangement on the roller 54, parallel to the roller rotational axis 58 on the outer lateral surface 60. This makes it possible for ten dough rings 40 to be able to be formed and, in particular stamped, simultaneously on the roller 54. It is also possible to provide a roller 54, which has more or less than ten stamping matrices along the roller rotational axis 58.

According to the embodiment shown, the stamping matrices 61, 62, 63 combined in a dough forming insert arrangement are in each case configured identically. A total of twelve dough forming insert arrangements are provided along the lateral surface 60 on the roller 54 along the rotational direction 59, four dough forming insert arrangements in each case having stamping matrices 61 with the internal matrix diameter $d_{i1}$, stamping matrices 62 with the internal matrix diameter $d_{i2}$ and stamping matrices 63 with the internal matrix diameter $d_{i3}$. With regard to a rotation angle about the roller rotational axis 58, the stamping matrices 61, 62, 63 are arranged equidistantly. The rotation angle between identical stamping matrices 61, 62, 63 is 90° in each case. In a 90° segment of this type, two further dough forming insert arrangements are provided, which in each case comprise the two other stamping matrices. Accordingly, a rotation angle with respect to the roller rotational axis 58 between two adjacent dough forming insert arrangements is 30°.

The stamping matrices 61, 62, 63 have an external thread 87 in the form of a fine thread, with which they can be screwed into the roller 54. Consequently, the stamping matrices 61, 62, 53 can be assembled and disassembled rapidly and in an uncomplicated manner on the roller 54. As the screwing of the stamping matrices 61, 62, 63 takes place directly to the roller 54 by means of the respectively provided external thread 87, it is unnecessary to provide additional fastening screws to screw the stamping matrices 61, 62, 63 in the radial direction with respect to the roller rotational axis 58. The fastening screws of this type would be arranged on the end face 65 of the stamping matrices 61, 62, 63 and would cause indentations in the end face 65, which are not desired, in particular where the dough pieces are processed. Stamping matrices 61, 62, 63 correspondingly have no counterbores. The stamping matrices 61, 62, 63 have a smooth end face 65 which is continuous with the exception of the matrix opening 64. As a result, a screwing of the stamping matrices 61, 62, 63 in the product region can be avoided. The hygiene and quality conditions in the production of the dough ring are therefore improved.

Furthermore, the stamping matrices 61, 62, 63 have an upper plate portion 66, which faces the outer lateral surface 60 and has a larger external diameter than the fine thread. The external diameter of the plate portion 66 is configured as a radial matrix fitting surface 89. The matrix fitting surface 89 guarantees the self-centring of the stamping matrices 61, 62, 63 on the roller 54. The external diameter of the plate portion 66 allows a self-centring assembly of the stamping matrices 61, 62, 63 in the recesses of the roller 54 provided for this. As a result, the stamping matrix 61, 62, 63 is fixed with regard to a radial positioning in relation to the roller rotational axis 58. The positioning of the stamping matrix 61, 62, 63 takes place with a precision of 0.02 mm. In particular, a pressing of the dough forming insert configured, for example, as a pricking mould, through into the interior of the roller 54 as a result of a pricking force acting radially with respect to the roller rotational axis 58, occurring during a pricking process, is ruled out.

A removal belt 67 is provided in the interior of the roller 54. The removal belt 67 is oriented along the roller rotational axis 58 and is used to remove stamped-out dough portions 68. The removal belt 67 is fixed with regard to the roller 54, i.e. in the event of a rotational movement of the roller 54 about the roller rotational axis 58 along the rotational direction 59, there is no rotation of the removal belt 67. Funnel plates 69 open at the top are arranged to the side of the removal belt 67 to ensure that the stamped-out dough portion 68 falls through the matrix opening 64 onto the removal belt 67. The removal belt 67 can be disassembled, i.e. removed from the interior of the roller 54. As a result, cleaning of the roller from the inside is facilitated, as the accessibility of the roller interior is improved.

In FIG. 3, the punch beam 53 is arranged above the roller 54. The punch beam 53 has a profile hollow cross section oriented perpendicular with respect to a punch beam longitudinal axis 70. Fastened to the punch beam 53 are a plurality of punches 71, 72, 73, which have various punch external diameters $d_{a1}, d_{a2}, d_{a3}$. The punch external diameter $d_{a1}, d_{a2}, d_{a3}$ are selected correspondingly to the internal matrix diameters $d_{i1}, d_{i2}, d_{i3}$ and are at most 0.2 mm larger than the respective corresponding internal matrix diameter $d_{i1}, d_{i2}, d_{i3}$, in particular at most 0.15 mm and, in particular, at most 0.1 mm.

The punches 71, 72, 73 are received by means of a receiving plate 74, which is screwed to the punch beam 53. The punches 71, 72, 73 are received in the receiving plate 74 by means of an external fine thread 88 of the punches 71, 72, 73. Furthermore, the punches 71, 72, 73 have a punch fitting surface 90, which is arranged coaxially with respect to the external fine thread 88. The punches 71, 72, 73 are in each case oriented radially with respect to a punch longitudinal axis 91 by means of the punch fitting surface 90, which is arranged on a corresponding receiver of the receiving plate 74. The punch fitting surface 90 has an external diameter which is enlarged compared to the punch external thread 88 in relation to the punch longitudinal axis 91. The punch external thread 88 is arranged on an end of the punch 71, 72, 73 facing the punch beam 53. The punch fitting surface 90 is provided adjacent to the punch external thread 88.

A stop in a radial direction in relation to the punch beam longitudinal axis 70 is ensured by an end face of the punches 71, 72, 73 configured as a fitting surface, with which the punch 71, 72, 73 is arranged on the receiving plate 74.

The roller rotational axis 58 and the punch beam longitudinal axis 70 are arranged parallel to one another. A plurality of punches 71, 72, 73 is arranged along the punch beam longitudinal axis 70. A plurality of punches 71, 72, 73 arranged one behind the other along the punch beam longitudinal axis 70 are combined in a punch arrangement, a punch arrangement, in particular, exclusively comprising identical punches 71, 72, 73. Accordingly in the embodiment shown in FIG. 4, three different punch arrangements with punches 71, 72, 73 are provided, the punch arrangements being arranged equidistantly on an outside of the punch beam 53 at a rotation angle of 120°. According to the embodiment in FIG. 4, the punch 73 is arranged in an operating position, i.e. facing the roller 54.

The punch beam has a lifting drive, not shown, to displace the punch beam 53 along a stroke direction 75. The stroke direction 75 is directed, according to the view in FIG. 4, vertically upward or vertically downward. The stroke direction 75 is oriented perpendicular to the roller rotational axis 58. With the punch beam 53, the punch 73 cooperating with the stamping matrix 63 fastened to the roller 54 is also displaced along the stroke direction 75.

A stripping device 76 is provided on the punch beam 53 and comprises a base plate 77 rigidly connected to the punch beam 53 and a stripper plate 79 connected thereto by a plurality of compression springs 78. On a lower side facing the roller 53, the stripper plate 79 has a plurality of contact elements 80 in the form of rubber stoppers. The compression springs 78 ensure a minimum spacing required along the stroke direction 75 between the base plate 77 and the stripper plate 79. The minimum spacing is selected in such a way that the respective punch 71, 72, 73 can be arranged with a lower stamping-out end face 81 between the two plates 77, 79 and can thereby return after a stroke movement has taken place for a stamping process between the plates 77, 79. The dough ring 40 possibly adhering to an outer wall of the punch 71, 72, 73, during the return stroke movement of the punch 71, 72, 73 is stripped off on the stripper plate 79 and falls onto the end face 65 of the stamping matrix 61, 62, 63. In addition, the arrangement of the punch 71, 72, 73 between the plates 77, 79 guarantees protection from mechanical impairments.

On an outer lateral surface, the punch beam 53 in each case has a compressed air channel 82, which is oriented parallel to the punch beam longitudinal axis 70. The compressed air channels 82 of the punch beam 53 are arranged on the surface of the punch beam in such a way that they can be connected by fastening the punches 71, 72, 73, in each case, to a compressed air channel 83 arranged concentrically with respect to the punch 71, 72, 73. This means that owing to the fastening of the punches 71, 72, 73 on the punch beam 53, a continuous compressed air channel 82, 83 from the punch beam 53 to the stamping-out end face 81 of the respective punch 71, 72, 73 is provided. By using a control disc, not shown, it is possible for only the punch used for stamping out, i.e. the punch 73 according to FIG. 4, to be loaded with compressed air. As a result, the compressed air consumption is reduced. Furthermore, the noise level caused by the compressed air loading is reduced.

The dough forming station 52 furthermore has a centring device 84, which can be displaced, independently of the stroke movement of the punch beam 53 along the stroke direction 75. The centring device 84 has a plurality of centring means 85, which are associated with one of the respective punches 71, 72, 73 and are configured substantially identically to the centring sheets 48 of the first centring station 47, to which reference is hereby made.

A method for operating the device 39 with the processing stations shown in FIGS. 3 and 4 will be described in more detail below. The method substantially corresponds to the method described with the aid of the device 1 shown in FIG. 1 up to and including the transfer of the dough pieces from the conveyor belt portion 24 to the conveyor belt portion 26. Accordingly, the dough pieces 40, which are transferred to the sprinkling station 42 shown on the right in FIG. 3, have been processed beforehand in the portioning and rounding mechanism and in the fermenting and forming device.

In the sprinkling station 42, the dough pieces 40 are sprinkled with flour. The sprinkled dough pieces 40 are then conveyed by the transporting belt 42 along the dough piece conveying direction 41 to the flat pressing station 45 and pressed flat there. From there, a further transportation using the transporting belt 43 to the first centring station 47 takes place, the dough pieces 40 pressed flat and scattered with flour and arranged centred on the transporting belt 43 then being pressed in the pressing station 49. For further transportation of the dough pieces 40 on the transporting belt 43, the first centring station 47 is lifted, i.e. moved away from the transporting belt 43. The pressed dough pieces 40 are transferred by means of the transporting belt 43 to the roller 54 of the dough forming station 52, in that these are deposited on the stamping-out matrix 63, which is shown in FIG. 3, which has the largest internal matrix diameter $d_{i3}$. The stamping-out matrix 63 is firstly positioned in the "one o'clock position", i.e. arranged offset relative to an uppermost position facing the stamping punch 73 through 30° with respect to the roller rotational axis 58 counter to the rotational direction 59. As soon as the dough piece 40 is arranged on the stamping-out matrix 63, the roller 54 rotates about the roller rotational axis 58 in the rotational direction 59 through 60°, so that the dough piece 40 arranged on the level end face 65 of the stamping-out matrix 63 is positioned in a horizontal position and facing the corresponding punch 73. The dough piece 40 is centred by means of the centring means 85.

Figure 4:
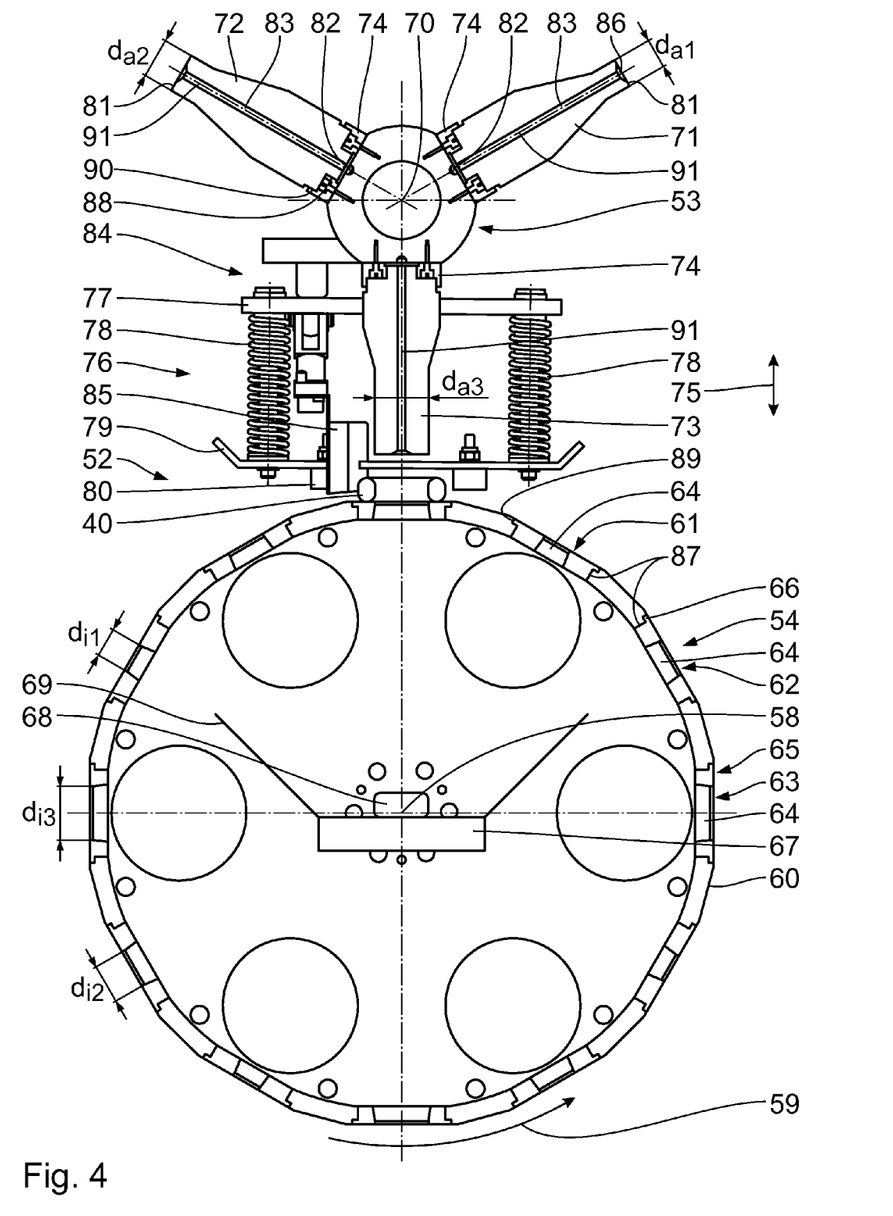
FIG. 4 shows an enlarged sectional view of the dough forming station, corresponding to FIG. 3.

In the state shown in FIG. 4, the transfer from the transporting belt 43 to the dough forming station 52, i.e. to the stamping-out matrix 63, and the 30° rotation about the roller rotational axis 58 have already taken place. The dough piece 40 arranged centred is deposited on the level end face 65 of the stamping matrix 63. By means of a stroke movement of the punch beam 53 with the punch 73 downward along the stroke direction 75, the dough portion 68 is stamped out of the dough piece 40 and pushed through the matrix opening 64 into the roller interior onto the removal belt 67. The removal belt 67 ensures the secure and rapid removal of the stamped-out dough remainders 68. These dough remainders 68 are collected hygienically and can be transported, in particular automatically, to the kneading device and therefore used for further use for dough. A method of this type is efficient and economical.

Since the contact elements 80 are provided on the lower side of the stripper plate 79, the contact elements 80, upon a downwardly directed stroke movement of the punch beam 53, rest on a frame, not shown, of the dough forming station 52. The frame is stationarily connected to the device 39 for forming the dough ring 40. This prevents a further vertical downward movement of the stripper plate 79, so the compression springs 78 are compressed. The stripper plate 79 is moved relative to the base plate 77. As a result, the punch with the stamping-out end face 81 can project through the opening in the stripper plate 79 and stamp out the dough portion 68 from the dough ring 40. If the punch beam 54 with the punch 73 is moved upwardly after the stamping-out process along the stroke direction 75, the compression springs 78 are relieved and the stripper plate 79 is then lifted together with the base plate 77. The dough ring 40 possibly adhering to the external wall of the punch 73 is thereby stripped off on the stripper plate 79. The dough ring 40, as a result of gravity, falls onto the end face 65 of the stamping matrix 63. The height of the contact elements 80 is determined in such a way that damage to the dough ring 40 resting on the stamping matrix 63 by the stripper plate 79 is ruled out. To reduce the possibility of the stamped-out dough portion 68 adhering to the stamping-out end face 81 of the punch 73, compressed air can be applied to the dough portion 68 via the compressed air channel 82, 83. In order to allow compressed air to be applied to the dough portion 68 over as large a surface as possible, the compressed air channels 83 have a funnel-shaped region 86 on the stamping-out end face 81.

Once the stamping-out process has been completed, the centring device 84 with the centring means 85 is displaced upwardly along the stroke direction 75 to allow a further transportation of the dough rings 40. In this case, the centring device 84 may have a separate lifting drive.

The further transportation of the stamped-out dough rings 40 takes place by means of a rotation of the roller 54 along the rotational direction 59 through about 60°, so that the stamped-out dough ring 40 is transferred to the delivery transporting belt 55, which is shown in FIG. 3. A centring of the stamped-out dough rings 40 firstly takes place there by means of the second centring station 56 and a transfer then takes place of the dough rings 40 that have been deposited in a centred manner into the suspension device 57.

Owing to the 60° rotation of the roller 54 to transfer the stamped-out dough rings 40 to the depositing transporting belt 55, the stamping matrix 63 located in the "3 o'clock position" in FIG. 3 is simultaneously displaced into the "1 o'clock position" and is prepared to receive the next dough ring 40 to be stamped out. It becomes clear from this that the dough forming by means of the dough forming station 52 can take place substantially continuously, the rotational movement of the roller 54 about the roller rotational axis 58 only being stopped during a stamping-out process. The continuous mode of operation of the dough forming station may, for example, be guaranteed by a control unit, not shown, which allows an electronic forced control by means of a so-called electronic cam disc, which can also be called a virtual cam disc. The electronic forced control may be in the form of a master-slave control and allows the forced control of the dough forming station 52, which is a slave process. The slave process at the dough forming station 52 is controlled by monitoring a master process, which, in particular, takes place at the upstream fermenting station of the device 39. For this purpose, a virtual guide value is used as the software signal, for example in the form of a position signal of the dough pieces or a speed signal of the dough conveyance to the control unit to control the roller drive and/or the lifting drive of the punch beam 53.

The dough forming station 52 leads to reduced wear, in particular of the stamping matrices 61, 62, 63, as they are arranged, in accordance with the embodiment, in a fourfold configuration on the roller 54 and therefore only cooperate at every fourth stroke of the punch beam 53 to process the dough piece 40 with the respective punch. The loading frequency of the stamping matrices 61, 62, 63 is therefore reduced to 25%. Accordingly, the service life of the stamping matrices 61, 62, 63 can be increased to fourfold. If exclusively identical stamping matrices 61, 62, 63 are used on the roller 54 in accordance with the embodiment shown, the operating life can be increased up to twelve times the value of the starting operating life of a stamping matrix 61, 62, 63. Thus, it is also possible, for example, in a product which is to be produced in very high piece numbers, to provide twelve identical stamping matrices on the roller 54 to therefore allow a very high operating life of identical stamping matrices. Since the stamping matrices 61, 62, 63 can be screwed into the roller 54, assembly and disassembly of the stamping matrices is possible in a rapid and uncomplicated manner. Moreover, it is possible to adjust them on the roller body with a high precision. The stamping matrices are arranged in a self-centring manner on the roller 54. The structure of the dough forming station 52 is compact and therefore can be arranged in a space-saving manner in the device 39 for forming dough rings 40.

Figure 5:
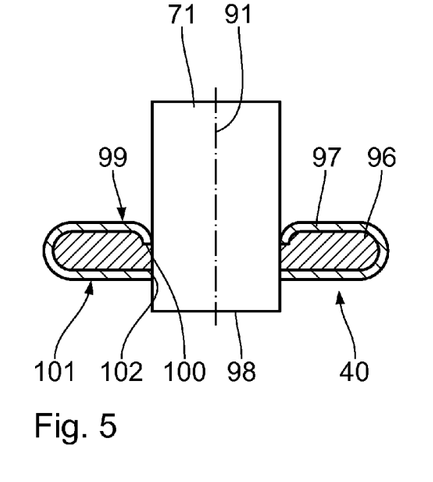
FIG. 5 shows a schematic view of a stamping process for producing a dough ring with a stamping punch according to a first embodiment and FIG. 6 to 8 show a schematic view of a stage sequence of a stamping process for producing a dough ring using a stamping punch according to a second embodiment.

A stamping process with a stamping punch 71 will be described in more detail below in accordance with a first embodiment. The stamping punch 71 has a punch longitudinal axis 91 and is configured rotationally-symmetrically as a cylinder with respect to the latter. Along the punch longitudinal axis 91, the punch 71 has a constant diameter. In the view shown, a stamping out of a dough portion has already taken place, i.e. the punch 71 has been moved downward along the punch longitudinal axis 91 in accordance with the view in FIG. 5. The dough piece 40 has a substantially homogeneous, inner dough mass 96, which is enclosed by a closed external skin 97, which is, in particular, fine in configuration. The dough mass 96 may be pasty in such a way that it is held by the external skin 97 in the disc shape of the dough piece 40. A destruction of the external skin 97 can lead to an undesired deformation of the dough piece 40, as the pasty dough mass 96 could escape from the open dough piece 40.

During the stamping out, the punch 71 with a stamping face 98 arranged at the bottom pushes through an upper end face 99 of the dough piece. When severing the upper end face 99, an open, in particular annular cutting face 100 of the upper end face 99 is produced, which, in the form of a cutting edge, is directed inwardly into the interior of the dough piece 40, i.e. to the dough mass 96. On further penetration of the punch 71 into the dough piece 40 and when also pushing through a lower end face 101 of the dough piece 40, the dough portion is pushed out and therefore a dough ring produced. When the punch 71 is drawn back from the dough ring 40, i.e. in accordance with the view in FIG. 5, a displacement of the punch 71 upwardly, the stamping process is completed. A stamping method of this type is uncomplicated and can be carried out rapidly, in particular. A stamping process of this type is suitable, in particular, for a dough piece 40 with a dough mass with high viscosity, i.e. the dough mass 97 is pasty. Accordingly, it is unproblematic if, as a consequence of the stamping process, an open substantially lateral surface of a cylinder-shaped separating face 102 results between the annular cutting face 100 of the upper end face 99 and the lower end face 101.

A second embodiment of a stamping punch 103 will be described in more detail below with the aid of FIGS. 6 to 8. Components which correspond to those which have already been described above with reference to FIG. 1 to 5 have the same reference numerals and will not be discussed again in detail.

The punch 103 has a stamping portion 92 with a stamping diameter $D_S$ and an entraining portion 93 with an entraining diameter $D_M$. The two portions 92, 93 are arranged one behind the other along the punch longitudinal axis 91 and concentrically with respect to the punch longitudinal axis 91. The two portions 92, 93 are cylindrical, but may also have other cross sectional shapes. Provided on the stamping portion 92 is the stamping face 98, which is used for pre-stamping and, in particular, for severing the upper end face 99 of the external skin 97 of the dough piece.

Figure 6:
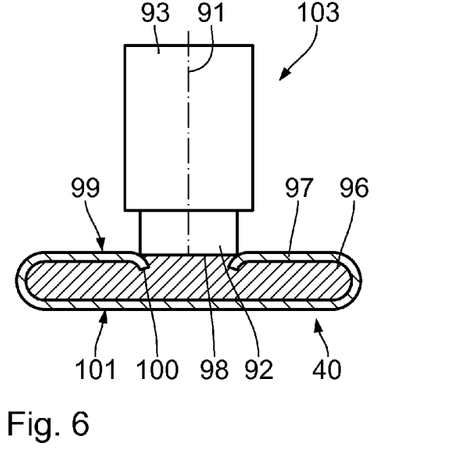
Figure 7:
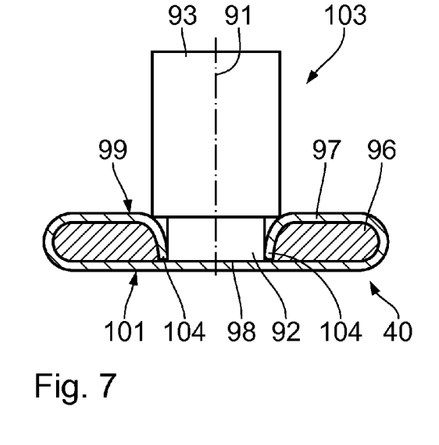

The pushing through of the external skin 97 in the region of the upper end face 99 is shown in FIG. 6. During the continuation of the stamping process, i.e. upon a further displacement of the punch 103 along the punch longitudinal axis 91 downwardly (cf. FIG. 7), the open cutting face 100 of the entraining portion 93, which has a larger diameter than the stamping portion 92, is entrained, i.e. the free ends 104 of the cutting face 100 are pressed inwardly into the interior of the dough piece 40 and therefore pressed toward the lower cutting face 101 of the external skin 97.

Figure 8:
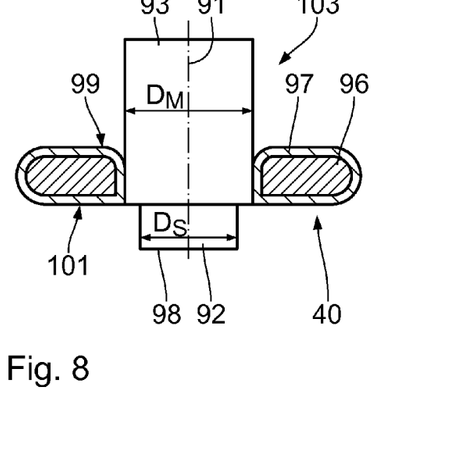

When the entraining portion 93, as shown in FIG. 8, has also completely penetrated the dough piece 40, the ends 104 of the upper end face 99 are connected to the lower end face 101. This results in a dough ring, which has a closed external skin both at an outer disc diameter and on an inner lateral surface of a cylinder-shaped internal ring. The punch 103 therefore allows a stamping of a dough ring, which, in particular, can have a low-viscosity dough mass 96, which is held, for example, by the external skin 97. Since the external skin is also permanently closed after the stamping process, an escape of the low-viscosity dough mass 96 is avoided. The dough ring 40 thus produced has a high shape accuracy and good dimensional stability.

The stamping diameter $D_S$ is reduced compared to the entraining diameter $D_M$ in such a way that the free ends 104 of the cutting face 100 of the external skin 97 on the upper end face 99 are long enough to be displaced, entrained by the entraining portion 93, to the lower end face 101 and to be connected there to the latter. In particular, a diameter difference is a multiple of a spacing between the upper end face 99 and the lower end face 101, in particular twice the spacing between the two end faces 99, 101. The spacing between the two end faces 99, 101 is also called the thickness of the dough piece.

What is claimed is:

1. A dough forming station (52) for a device for forming a dough ring (40) from a piece of dough, comprising
   a. a roller (54) with
      i. a roller rotational axis (58) and
      ii. a plurality of dough forming inserts (61, 62, 63) arranged on an outer lateral surface (60) of the roller (54),
   b. a punch beam (53), which has a punch beam longitudinal axis (70), with at least one punch (71, 72, 73; 103), wherein the at least one punch (103) has a stamping portion (92) with a stamping diameter ($D_S$) and an entraining portion (93) with an entraining diameter ($D_M$), the stamping diameter ($D_S$) being smaller than the entraining diameter ($D_m$),
   c. a piece of dough is arranged for forming between the at least one punch (71, 72, 73; 103) and the respective dough forming insert (61, 62, 63),
   d. a lifting drive is provided to displace the punch beam (53) with the at least one punch (71, 72, 73; 103) along a stroke direction (75) oriented perpendicular to the roller rotational axis (58) such that a portion of dough is stamped out of the piece of dough by the at least one punch and the respective dough forming insert to form a dough ring,
   e. the roller rotational axis (58) and the punch beam longitudinal axis (70) are oriented parallel to one another,
   f. the plurality of dough forming inserts (61, 62, 63) are arranged about the roller longitudinal axis (58) along a rotational direction (59), and
   g. the piece of dough is arranged on the respective dough forming insert.

2. A dough forming station (52) according to claim 1, wherein the roller (54) has a roller drive for a rotational movement along the rotational direction (59) in such a way that respective dough forming insert (61, 62, 63) faces the at least one corresponding punch (71, 72, 73; 103).

3. A dough forming station (52) according to claim 1, comprising at least one dough forming insert arrangement, which has the plurality of dough forming inserts (61, 62, 63) arranged parallel to the roller rotational axis (58), and a punch arrangement, which has a plurality of punches (71, 72, 73; 103) arranged on the punch beam (53) along the punch beam longitudinal axis (70).

4. A dough forming station (52) according to claim 3, comprising a plurality of dough forming insert arrangements, which are arranged about the roller rotational axis (58) along the rotational direction (59).

5. A dough forming station (52) according to claim 4, wherein the dough forming insert arrangements are arranged equidistantly along the rotational direction (59).

6. A dough forming station (52) according to claim 4, wherein the dough forming insert arrangements are arranged with a rotation angle of 90° with respect to the roller rotational axis (58).

7. A dough forming station (52) according to claim 5, wherein at least one further dough forming insert arrangement are provided between the equidistantly arranged dough forming insert arrangements.

8. A dough forming station (52) according to claim 7, wherein the at least one further dough forming insert arrangement have various types of dough forming inserts (61, 62, 63).

9. A dough forming station (52) according to claim 3, comprising a plurality of punch arrangements on the punch beam (53).

10. A dough forming station (52) according to claim 3, wherein the punches (71, 72, 73; 103) of various punch arrangements having different external punch diameters ($d_{a1}$, $d_{a2}$, $d_{a3}$).

11. A dough forming station (52) according to claim 1, wherein the dough forming inserts (61, 62, 63) are arranged in a self-centring manner on the roller (54).

12. A dough forming station (52) according to claim 1, wherein the dough forming inserts (61, 62, 63) have a thread for screwing onto the roller (54).

13. A dough forming station (52) according to claim 1, wherein the plurality of dough forming inserts (61, 62, 63) have a fine thread for screwing onto the roller (54).

14. A dough forming station (52) according to claim 1, wherein the plurality of dough forming inserts are stamping matrices (61, 62, 63).

15. A dough forming station (52) for a device for forming dough ring (40) from a piece of dough, comprising
a. a roller (54) with
  i. a roller rotational axis (58) and
  ii. a plurality of dough forming inserts (61, 62, 63) arranged on an outer lateral surface (60) of the roller (54),
b. a punch beam (53), which has a punch beam longitudinal axis (70), with at least one punch (71, 72, 73; 103), wherein the at least one punch (103) has a stamping portion (92) with a stamping diameter ($D_S$) and an entraining portion (93) with an entraining diameter ($D_M$), the stamping diameter ($D_S$) being smaller than the entraining diameter ($D_M$),
c. a piece of dough is arranged for forming between the at least one punch (71, 72, 73; 103) and the respective dough forming insert (61, 62, 63),
d. a lifting drive is provided to displace the punch beam (53) with the at least one punch (71, 72, 73; 103) along a stroke direction (75) oriented perpendicular to the roller rotational axis (58) such that a portion of dough is stamped out of the piece of dough by the at least one punch and the dough forming insert to form a dough ring,
e. the roller rotational axis (58) and the punch beam longitudinal axis (70) are oriented parallel to one another,
f. the plurality of dough forming inserts (61, 62, 63) are arranged about the roller longitudinal axis (58) along a rotational direction (59), and
g. the piece of dough is arranged on the dough forming insert,
wherein the dough forming inserts are a plurality of matrix changing inserts.

16. A dough forming station (52) according to claim 15, wherein the stamping matrices (61, 62, 63) have different internal matrix diameters ($d_{i1}$, $d_{i2}$, $d_{i3}$).

17. A dough forming station (52) according to claim 1, comprising polygonal external contour of the roller (54) oriented perpendicular to the roller rotational axis (58), with substantially level support face portions (65) of the respective dough forming insert (61, 62, 63).

18. A dough forming station (52) according to claim 1, comprising a centering means (85) associated with the at least one punch (71, 72, 73), for centering the dough ring (40) on the respective dough forming insert (61, 62, 63) before the dough forming by the at least one punch (71, 72, 73; 103).

19. A dough forming station (52) according to claim 1, wherein the at least one punch (71, 72, 73; 103) is arranged in a self-centering manner on the punch beam (53).

20. A dough forming station (52) according to claim 1, wherein the at least one punch (71, 72, 73; 103) has a thread for screwing on the punch beam (53).

21. A dough forming station (52) according to claim 1, wherein the at least one punch (71, 72, 73; 103) has a fine thread for screwing on the punch beam (53).

22. A dough forming station (52) according to claim 1, wherein the at least one punch (71, 72, 73; 103) has a fitting surface for arranging on the punch beam (53) in a defined position.

23. A dough forming station according to claim 1, wherein a control unit for electronic forced control is in signal connection to the dough forming station (52).

24. A dough forming station according to claim 23, wherein the control unit is a master-slave control, wherein a dough processing at a fermenting station is used as a master process for the dough processing and the dough forming station (52) is used as a slave process.

25. A device for forming a dough ring (40) from a piece of dough with a dough forming station, comprising
a. a roller (54) with
  i. a roller rotational axis (58) and
  ii. a plurality of dough forming inserts (61, 62, 63) arranged on an outer lateral surface (60) of the roller (54),
b. a punch beam (53), which has a punch beam longitudinal axis (70), with at least one punch (71, 72, 73; 103), wherein the at least one punch (103) has a stamping portion (92) with a stamping diameter ($D_S$) and an entraining portion (93) with an entraining diameter ($D_M$), the stamping diameter ($D_S$) being smaller than the entraining diameter ($D_M$),
c. a piece of dough is arranged for forming between the at least one punch (71, 72, 73; 103) and the respective dough forming insert (61, 62, 63),
d. a lifting drive is provided to displace the punch beam (53) with the at least one punch (71, 72, 73; 103) along a stroke direction (75) oriented perpendicular to the roller rotational axis (58) such that a portion of dough is stamped out of the piece of dough by the at least one punch and the respective dough forming insert to form a dough ring,
e. the roller rotational axis (58) and the punch beam longitudinal axis (70) are oriented parallel to one another,
f. the plurality of dough forming inserts (61, 62, 63) are arranged about the roller longitudinal axis (58) along a rotational direction (59), and
g. the piece of dough is arranged on the respective dough forming insert.

* * * * *